United States Patent
Cui et al.

(10) Patent No.: US 12,504,113 B2
(45) Date of Patent: Dec. 23, 2025

(54) MULTIDIRECTIONAL ADJUSTMENT SUPPORT AND CAMERA DEVICE

(71) Applicant: ZHEJIANG UNIVIEW TECHNOLOGIES CO., LTD., Zhejiang (CN)

(72) Inventors: Gaoshang Cui, Zhejiang (CN); Zeyu Gan, Zhejiang (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 107 days.

(21) Appl. No.: 18/562,588

(22) PCT Filed: Dec. 8, 2021

(86) PCT No.: PCT/CN2021/136266
§ 371 (c)(1),
(2) Date: Nov. 20, 2023

(87) PCT Pub. No.: WO2022/257393
PCT Pub. Date: Dec. 15, 2022

(65) Prior Publication Data
US 2024/0240749 A1 Jul. 18, 2024

(30) Foreign Application Priority Data
Jun. 9, 2021 (CN) .......................... 202121285878.6

(51) Int. Cl.
*F16M 11/12* (2006.01)
*F16M 13/02* (2006.01)
*G03B 17/56* (2021.01)

(52) U.S. Cl.
CPC .......... *F16M 11/126* (2013.01); *F16M 13/02* (2013.01); *G03B 17/561* (2013.01)

(58) Field of Classification Search
CPC ........ F16M 11/04; F16M 11/12; F16M 11/18; F16M 11/2035; F16M 11/2042;
(Continued)

(56) References Cited

U.S. PATENT DOCUMENTS 5,790,910 A * 8/1998 Haskin ................... F16M 13/02
396/428
6,634,804 B1 * 10/2003 Toste ................. F16M 11/2014
396/427
(Continued)

FOREIGN PATENT DOCUMENTS

CN 202472218 U 10/2012
CN 202475604 U 10/2012
(Continued)

OTHER PUBLICATIONS

International Search Report in Application No. PCT/CN2021/136266, dated Mar. 1, 2022, 4 pages, including translation.
(Continued)

*Primary Examiner* — Eret C McNichols
(74) *Attorney, Agent, or Firm* — MASCHOFF BRENNAN

(57) ABSTRACT

A multidirectional adjustment support includes a base, a first rotating member that is rotatably connected to the base, and a second rotating member that is rotatably connected to the first rotating member. A rotation plane formed by the rotation of the first rotating member intersects a rotation plane formed by the rotation of the second rotating member. The base is provided with a first limiting structure. The first rotating member is provided with a second limiting structure. The first limiting structure and the second limiting structure are configured to cooperate with and limit relative positions between each other. The second rotating member is provided with a third limiting structure. The first limiting structure and the third limiting structure are configured to
(Continued)

cooperate with and limit relative positions between each other.

20 Claims, 6 Drawing Sheets

(58) Field of Classification Search
CPC .......... F16M 11/2064; F16M 11/2028; F16M 13/02; G03B 17/561; G03B 17/56
See application file for complete search history.

(56) References Cited

U.S. PATENT DOCUMENTS

| | | | | |
|---|---|---|---|---|
| 7,599,000 | B2 * | 10/2009 | Lai | F16M 11/08 |
| | | | | 348/373 |
| 7,658,554 | B2 * | 2/2010 | Takahashi | F16M 11/10 |
| | | | | 348/143 |
| 8,998,512 | B1 * | 4/2015 | Celler | F16M 11/2057 |
| | | | | 396/428 |
| 9,057,934 | B2 * | 6/2015 | Lellky | F16M 11/2014 |
| 9,920,875 | B2 * | 3/2018 | Mitchell | G03B 17/561 |
| 11,274,789 | B2 * | 3/2022 | Burdick | G03B 17/561 |
| 11,385,529 | B2 * | 7/2022 | Li | F16M 11/06 |
| 2007/0165137 | A1 * | 7/2007 | Lai | F16M 11/2021 |
| | | | | 348/375 |
| 2008/0226282 | A1 * | 9/2008 | Takahashi | F16M 13/027 |
| | | | | 396/427 |
| 2010/0225803 | A1 | 9/2010 | Matsuhashi et al. | |
| 2017/0293206 | A1 | 10/2017 | Wood | |

FOREIGN PATENT DOCUMENTS

| | | |
|---|---|---|
| CN | 206539833 U | 10/2017 |
| CN | 211083521 U | 7/2020 |
| CN | 211289445 U | 8/2020 |
| EP | 3343067 A1 | 7/2018 |

OTHER PUBLICATIONS

Extended European Search Report in Application No. 21944889.1, dated Mar. 19, 2025, 8 pages.

* cited by examiner

MULTIDIRECTIONAL ADJUSTMENT SUPPORT AND CAMERA DEVICE

CROSS REFERENCE TO RELATED APPLICATIONS

This is a national stage application filed under 37 U.S.C. 371 based on International Patent Application No. PCT/CN2021/136266, filed Dec. 8, 2021, which claims priority to Chinese Patent Application No. 202121285878.6 filed with the China National Intellectual Property Administration (CNIPA) on Jun. 9, 2021, the disclosure of which is incorporated herein by reference in its entirety.

TECHNICAL FIELD

The present application relates to the field of adjustment supports, for example, a multidirectional adjustment support and a camera device.

BACKGROUND

With the rapid development of the video surveillance field, functions and applications of cameras become more and more powerful. From analog cameras to digital cameras and then to smart cameras, each upgrade can bring new breakthroughs. As public security awareness improves, the prevalence of surveillance cameras is steadily increasing and becoming more familiar and widely used. A support is required to mount a camera. To satisfy the requirements of different scenarios, the support is required to have an angle adjustment function. However, when adjustments are needed in multiple directions, such as horizontal and perpendicular directions, multiple rotating members are used for adjustment, making the positioning of the multiple rotating members relatively intricate.

In addition, most camera supports in the market can only be adjusted in one direction by loosening one structural member, making the adjustment very inconvenient. In some supports, one structural member may allow adjustment in two directions, but the supports are not secure enough and are prone to loosening.

SUMMARY

The present application provides a multidirectional adjustment support and a camera device, ensuring a simple structure, and convenient adjustment.

The present application provides a multidirectional adjustment support. The multidirectional adjustment support includes a base, a first rotating member that is rotatably connected to the base, and a second rotating member that is rotatably connected to the first rotating member. A rotation plane formed by rotation of the first rotating member intersects a rotation plane formed by rotation of the second rotating member. The base is provided with a first limiting structure. The first rotating member is provided with a second limiting structure. The first limiting structure and the second limiting structure are configured to cooperate with and limit relative positions between each other. The second rotating member is provided with a third limiting structure. The first limiting structure and the third limiting structure are configured to cooperate with and limit relative positions between each other.

A camera device is further provided, including the preceding multidirectional adjustment support and a camera apparatus mounted on a mounting base of the multidirectional adjustment support.

Figure 1:
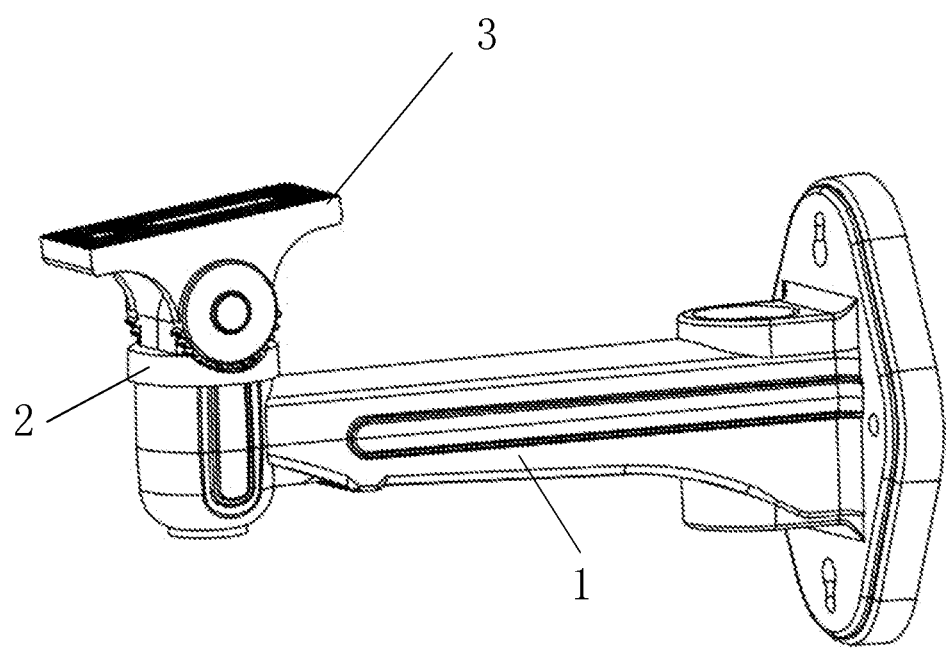
FIG. 1 is a perspective view illustrating a multidirectional adjustment support according to an embodiment of the present application.

REFERENCE LIST 1 base
1210 first limiting structure
1220 through hole
10 support body
11 bottom base
12 sleeve
1210a first limiting portion
1210b second limiting portion
121 open end
122 bottom wall
110 connection hole
1211 protrusion
2 first rotating member
231 second limiting structure
210 threaded hole
21 rotatable shaft
22 mounting head
23 convex ring portion
230 opening
220 passing hole
2310 first tooth
3 second rotating member
311 third limiting structure
30 mounting base
31 extension wall
310 mounting hole
3110 second tooth
4 adjustment member
5 pivot shaft

DETAILED DESCRIPTION

Embodiments of the present application are described below with reference to the drawings. If not in collision, the embodiments described herein and the features thereof can be combined with each other.

An embodiment of the present application provides a multidirectional adjustment support. The multidirectional adjustment support is applicable to a camera device, a mobile terminal product and the like. This embodiment is illustrated by using an example in which the multidirectional adjustment support is applied to a camera device.

Figure 10:
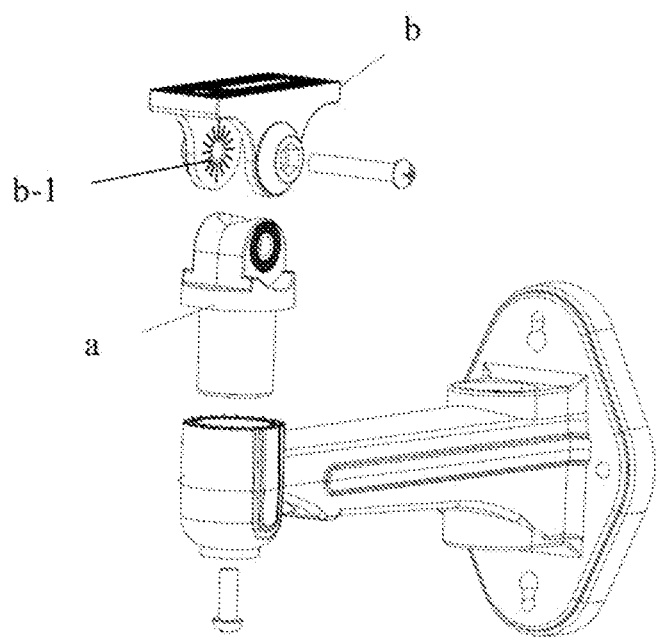
FIG. 10 is a view illustrating a camera adjustment support according to an embodiment of the present application.

As shown in FIG. 10, a camera respectively controls the rotations of a horizontal rotating member a and a perpendicular rotating member b through two locking screws to adjust the support in horizontal and vertical directions. This scheme achieves simultaneous horizontal and perpendicular adjustment of the support, requiring the two locking screws of the support to be unscrewed respectively to adjust in the two directions simultaneously. As a result, the adjustment is inconvenient.

As shown in FIGS. 1 to 9, the multidirectional adjustment support of the embodiment of the present application includes a base 1, a first rotating member 2 that is rotatably connected to the base 1, and a second rotating member 3 that is rotatably connected to the first rotating member 2. The multidirectional adjustment support can be adjusted multi-directionally through the first rotating member 2 and the second rotating member 3. A rotation plane formed by the rotation of the first rotating member 2 intersects a rotation plane formed by the rotation of the second rotating member 3. The base 1 is provided with a first limiting structure 1210. The first rotating member 2 is provided with a second limiting structure 231. The first limiting structure 1210 and the second limiting structure 231 are configured to cooperate with and limit relative positions between each other. The second rotating member 3 is provided with a third limiting structure 311. The first limiting structure 1210 and the third limiting structure 311 are configured to cooperate with and limit relative positions between each other. Exemplarily, in this embodiment, the first rotating member 2 may rotate about a horizontal direction, and the second rotating member 3 rotates about a perpendicular direction, so the rotation planes of the first rotating member 2 and the second rotating member 3 are perpendicular to each other.

Figure 2:
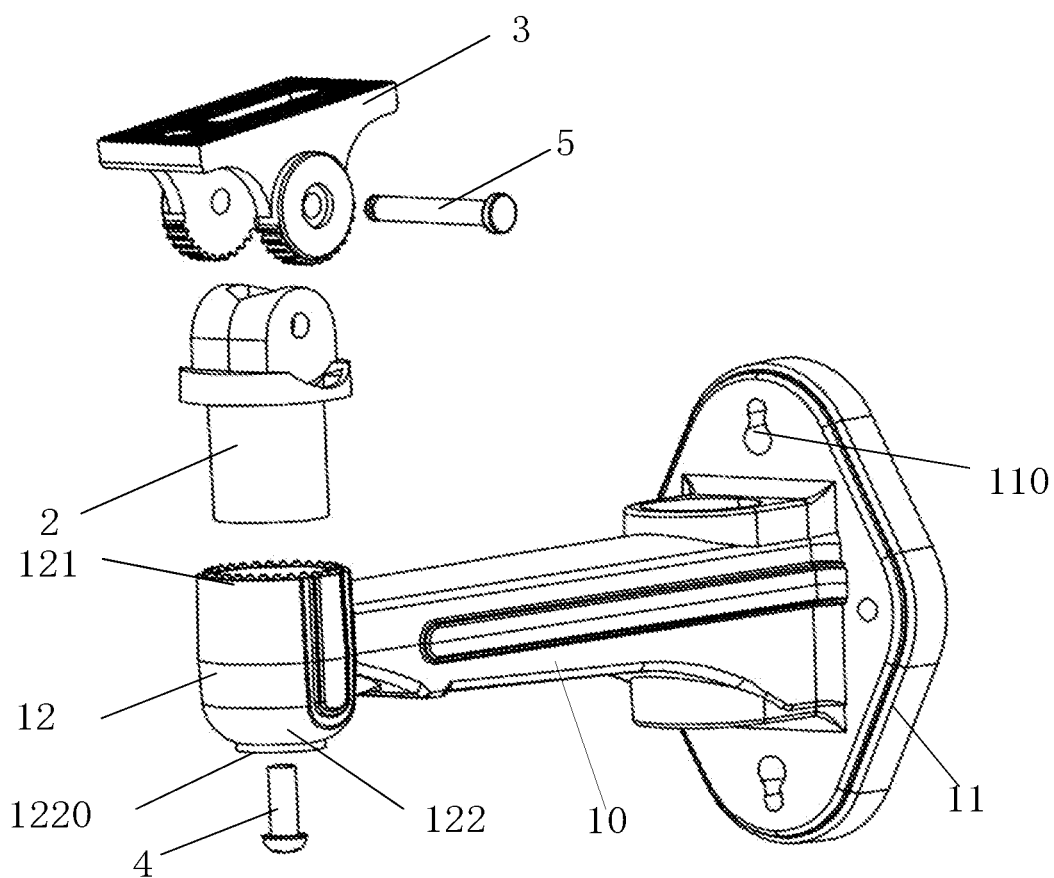
FIG. 2 is an exploded perspective view of FIG. 1.
Figure 3:
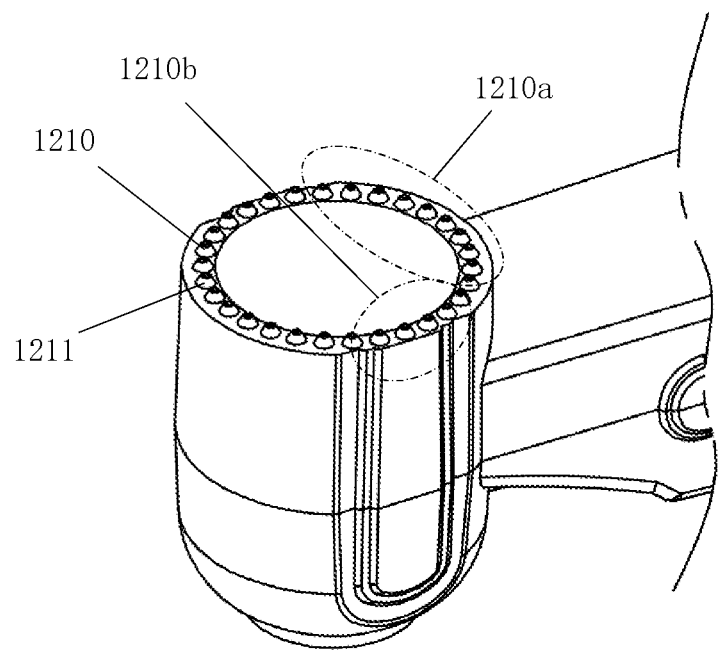
FIG. 3 is a view illustrating a first limiting structure of a multidirectional adjustment support according to an embodiment of the present application.
Figure 4:
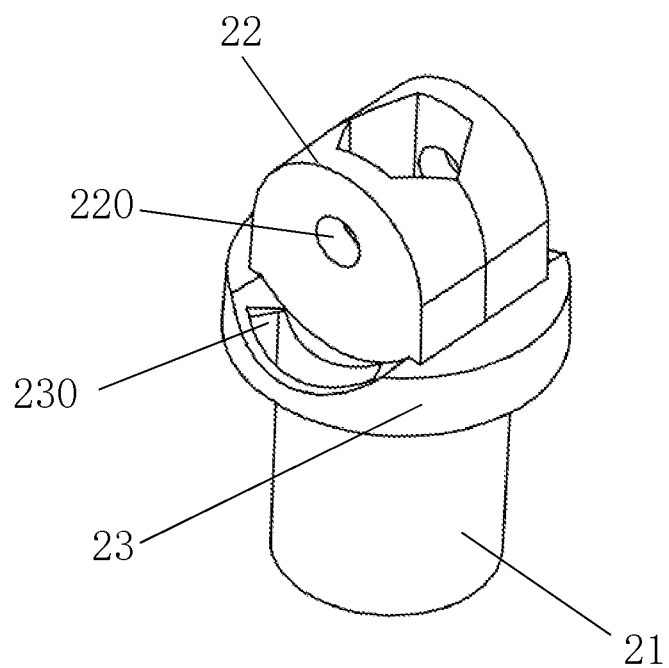
FIG. 4 is a perspective view illustrating an angle of a first rotating member of a multidirectional adjustment support according to an embodiment of the present application.

As shown in FIGS. 2 to 4, the base 1 includes a support body 10, a bottom base 11 disposed at one end of the support body 10 and capable of being secured to a mounting surface, and a sleeve 12 disposed at the other end of the support body 10. The first limiting structure 1210 is disposed at an open end 121 of the sleeve 12. The bottom base 11 is provided with multiple connection holes 110 and may be configured to connect to the mounting surface by using adjustment screws, and the mounting surface may be a wall plane. The sleeve 12 has the open end 121 and a bottom wall 122 opposite to the open end 121. The bottom wall 122 is provided with a through hole 1220. The base 1 is provided with the first limiting structure 1210 (referring to FIG. 3). In this embodiment, the first limiting structure 1210 includes multiple protrusions 1211 disposed on an end surface of the open end 121 of the sleeve 12 and spaced apart along a circumferential direction of the end surface of the open end 121 of the sleeve 12. In other embodiments, the first limiting structure 1210 may also be tooth-shaped. This is not limited herein.

The first rotating member 2 includes a rotatable shaft 21, a mounting head 22, and a convex ring portion 23 located between the rotatable shaft 21 and the mounting head 22. The rotatable shaft 21 extends from the open end 121 of the sleeve 12 into the sleeve 12 and may rotate in the sleeve 12. The convex ring portion 23 includes a first end surface opposite to the open end 121 of the sleeve 12. The second limiting structure 231 is disposed on the first end surface.

Figure 5:
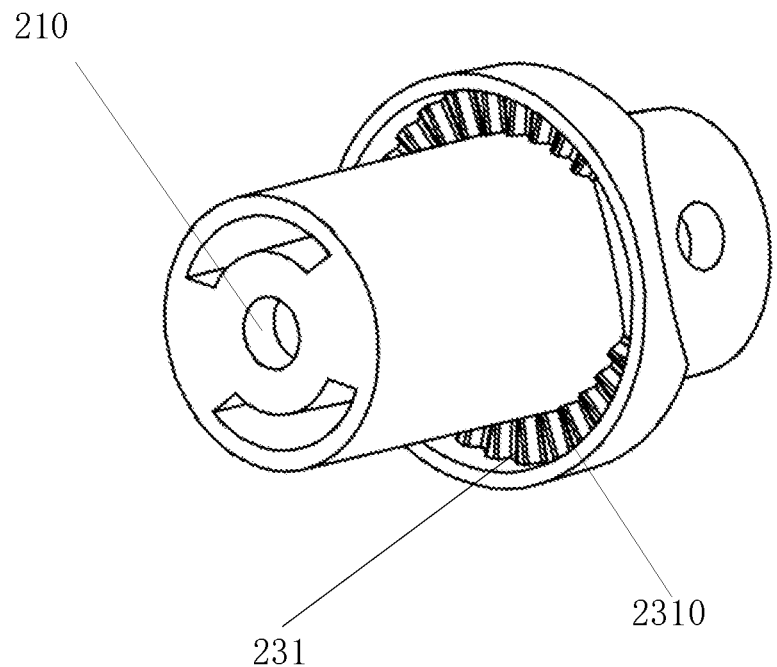
FIG. 5 is a perspective view illustrating another angle of a first rotating member of a multidirectional adjustment support according to an embodiment of the present application.

As shown in FIGS. 3 to 5, the first rotating member 2 includes the rotatable shaft 21 that is connected to the base 1, extends into the sleeve 12 and may rotate in the sleeve 12, the mounting head 22 connected to the second rotating member 3, and the convex ring portion 23 located between the rotatable shaft 21 and the mounting head 22.

The first limiting structure 1210 includes the multiple protrusions 1211 spaced apart along the circumferential direction of the end surface of the open end 121 of the sleeve 12. The second limiting structure 231 includes multiple first teeth 2310 arranged along a circumferential direction of the first end surface of the convex ring portion 23 and capable of being engaged with a part of the multiple protrusions 1211. The third limiting structure 311 includes multiple second teeth 3110 disposed on end surfaces of extension walls 31 close to the open end 121 of the sleeve 12 and capable of being engaged with the other part of the multiple protrusions 1211.

An end of the rotatable shaft 21 close to the bottom wall 122 of the sleeve 12 is provided with a threaded hole 210. The mounting head 22 is provided with a passing hole 220 passing two side surfaces. The top of the mounting head 22 is arc-shaped to avoid interference when the second rotating member 3 rotates. The first rotating member 2 includes the second limiting structure 231. The second limiting structure 231 and the first limiting structure 1210 are configured to cooperate with and limit relative positions between each other and the second limiting structure 231 is configured to limit the rotation of the first rotating member 2. The first limiting structure 1210 includes a first limiting portion 1210a and a second limiting portion 1210b. The first limiting portion 1210a and the second limiting structure 231 can cooperate with and limit relative positions between each other, and the second limiting portion 1210b and the third limiting structure 311 can cooperate with and limit relative positions between each other. The convex ring portion 23 is provided with an opening 230 through which the second limiting portion 1210b or the third limiting structure 311 passes. The opening 230 is a circular arc form with a low middle and two high ends along the thickness direction of the convex ring portion 23. In this embodiment, the second limiting structure 231 includes multiple first teeth 2310 disposed on the first end surface of the convex ring portion 23 and arranged along the circumferential direction of the first end surface. The multiple first teeth 2310 can be engaged and positioned with the multiple protrusions 1211 of the sleeve 12 mutually. The first limiting portion 1210a and the second limiting portion 1210b are each a part of the multiple protrusions 1211. One protrusion 1211 may be engaged with one first teeth 2310.

Figure 6:
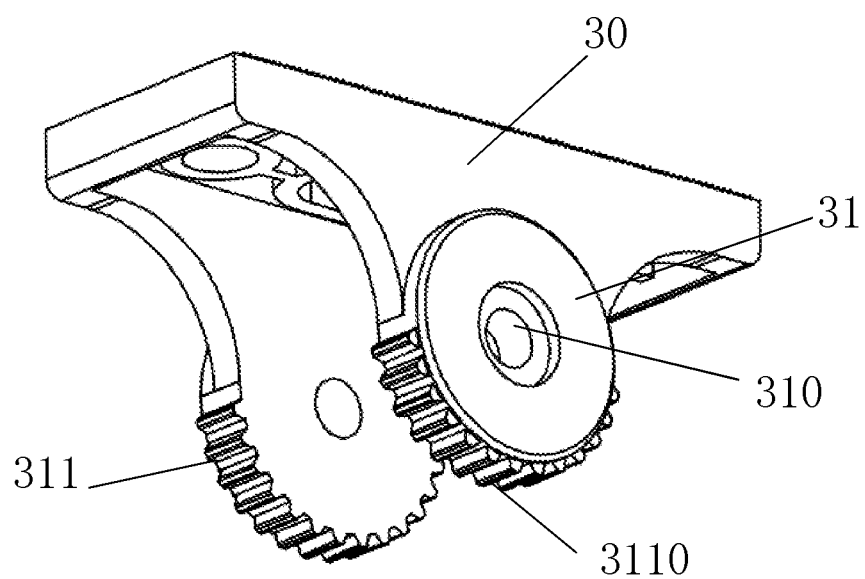
FIG. 6 is a perspective view illustrating a second rotating member of a multidirectional adjustment support according to an embodiment of the present application.

As shown in FIGS. 2 and 6, the second rotating member 3 includes a mounting base 30 capable of mounting an operative device, extension walls 31 (referring to FIG. 6) extending toward the position of the opening 230 from two sides of the mounting base 30, and a pivot shaft 5. The extension walls 31 clamp two sides of the mounting head 22. The pivot shaft 5 is connected to the mounting head 22 and the extension walls 31. The third limiting structure 311 is disposed on each of end surfaces of the extension walls 31 close to the open end 121 of the sleeve 12. The extension walls 31 are each provided with a mounting hole 310. The end surfaces of the extension walls 31 close to the open end 121 of the sleeve 12 are each a circular arc surface. The central line of the circular arc surface coincides with the rotating axis of the second rotating member 3 to enable the third limiting structure 311 to keep a distance from the first limiting structure 1210 within the rotation range of the second rotating member 3. The second rotating member 3 is provided with the third limiting structure 311. The third limiting structure 311 and the first limiting structure 1210 are configured to cooperate with and limit relative positions between each other, and the third limiting structure 311 is configured to limit the rotation of the second rotating member 3. In this embodiment, the third limiting structure 311 includes multiple second teeth 3110 disposed on the end surfaces of the extension walls 31 close to the open end 121 of the sleeve 12.

In the present application, the first limiting structure 1210 is disposed on the base 1, the second limiting structure 231 is disposed on the first rotating member 2, and the third limiting structure 311 is disposed on the second rotating member 3, where the second limiting structure 231 and the first limiting structure 1210 are configured to cooperate with and limit relative positions between each other, and the third limiting structure 311 and the first limiting structure 1210 are configured to cooperate with and limit relative positions between each other, so that the locking and positioning or the loosening and direction-adjustment of the first rotating member 2 and the second rotating member 3 can be completed through one operation.

As shown in FIG. 2, in this embodiment, the multidirectional adjustment support further includes an adjustment member 4 connecting the base 1 and the first rotating member 2 and the pivot shaft 5 connecting the second rotating member 3 and the first rotating member 2.

The adjustment member 4 is configured to make the base 1 and the first rotating member 2 to move close to each other so as to enable the first limiting structure 1210 and the second limiting structure 231 to cooperate with and limit relative positions between each other and enable the first limiting structure 1210 and the third limiting structure 311 to cooperate with and limit relative positions between each other, or to make the base 1 and the first rotating member 2 to move away from each other so as to disable the first limiting structure 1210 and the second limiting structure 231 to cooperate with and limit relative positions between each other and disable the first limiting structure 1210 and the third limiting structure 311 to cooperate with and limit relative positions between each other. In this embodiment, the adjustment member 4 passes through the bottom wall 122 of the sleeve 12, is connected to the rotatable shaft 21, and can reduce or increase the distance between the sleeve 12 and the convex ring portion 23 so as to make the first limiting structure 1210 and the second limiting structure 231 to cooperate with and limit relative positions between each other and enable the first limiting structure 1210 and the third limiting structure 311 to cooperate with and limit relative positions between each other, or disable the first limiting structure 1210 and the second limiting structure 231 to cooperate with and limit relative positions between each other and disable the first limiting structure 1210 and the third limiting structure 311 to cooperate with and limit relative positions between each other. In this embodiment, the adjustment member 4 is an adjustment screw, the through hole 1220 is disposed on the base 1, the threaded hole 210 is disposed on the first rotating member 2, and the adjustment screw is connected to the threaded hole 210 after passing through the through hole 1220. The central axis of the adjustment screw and the rotating axis of the first rotating member 2 have the same extension direction to enable the adjustment screw to only need to adjust a relatively small stroke when the cooperation and the position limitations between the first limiting structure 1210 and both of the second limiting structure 231 and the third limiting structure 311 are enabled or disabled. The central axis of the adjustment screw and the rotating axis of the first rotating member 2 may also have different extension directions. This is not limited herein.

Figure 7:
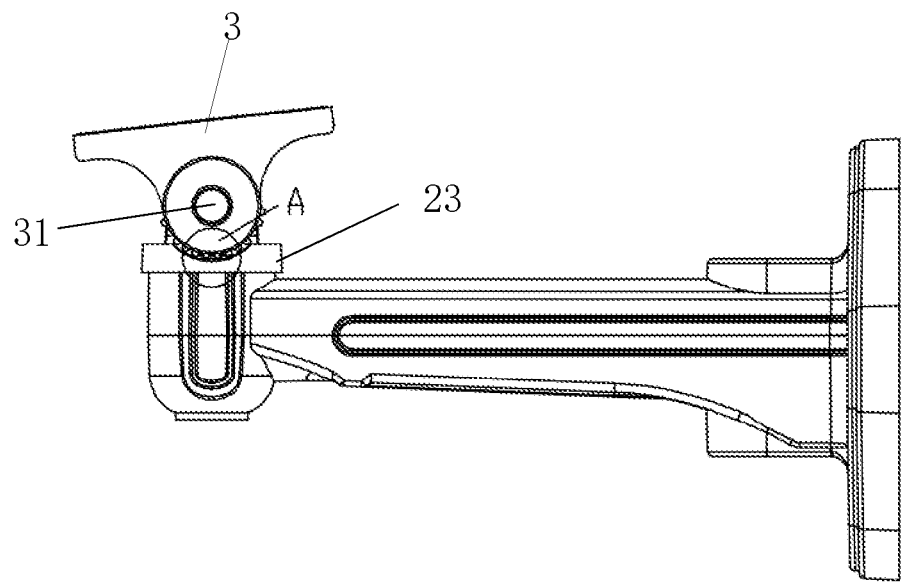
FIG. 7 is a front view illustrating a multidirectional adjustment support according to an embodiment of the present application.
Figure 8:
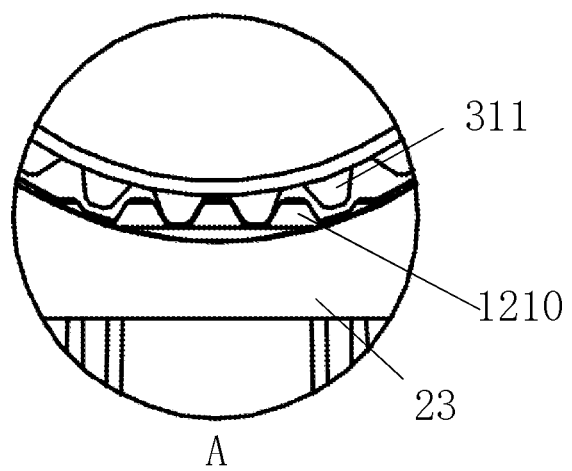
FIG. 8 is an enlarged view of part A of FIG. 7.
Figure 9:
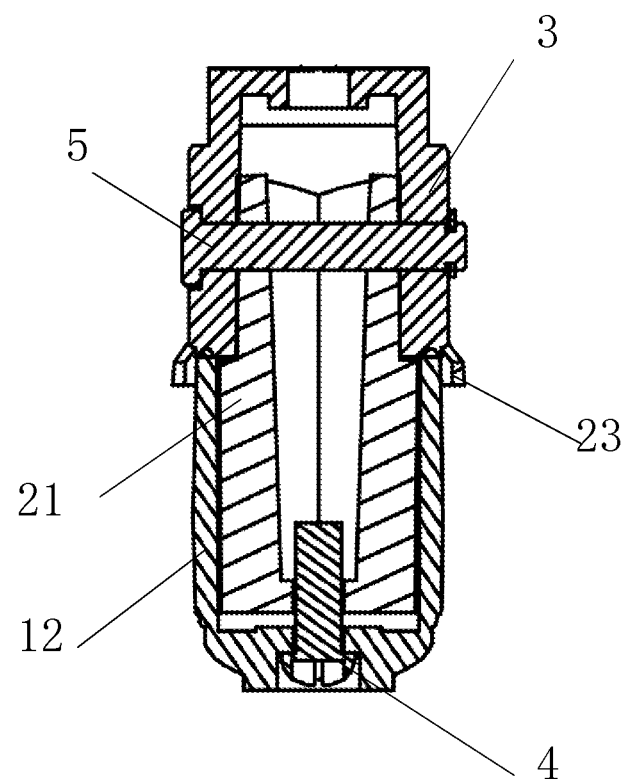
FIG. 9 is a partial sectional view illustrating a multidirectional adjustment support according to an embodiment of the present application.

As shown in FIGS. 7 to 9, in this embodiment, when the multidirectional adjustment support is mounted, the rotatable shaft 21 extends from the open end 121 of the sleeve 12 into the sleeve 12 and can rotate with respect to the sleeve 12 so that the first rotating member 2 can rotate on the base 1. Meanwhile, the open end 121 of the sleeve 12 abuts onto the first end surface of the convex ring portion 23 so that the first limiting portion 1210a of the first limiting structure 1210 and the second limiting structure 231 can cooperate with and limit relative positions between each other, and the second limiting portion 1210b and the third limiting structure 311 can cooperate with and limit relative positions between each other through the opening 230. The adjustment member 4 passes through the through hole 1220 of the sleeve 12 along an axial direction of the sleeve 12 and is connected to the threaded hole 210 of the rotatable shaft 21, connecting the bottom wall 122 of the sleeve 12 and an end of the rotatable shaft 21 opposite to the bottom wall 122. The extension walls 31 clamp the two sides of the mounting head 22 and extend toward the position of the opening 230. The third limiting structure 311 and the first limiting structure 1210 can cooperate with and limit relative positions between each other through the opening 230 of the convex ring portion 23. The pivot shaft 5 passes through the mounting holes 310 of the extension walls 31 and the passing hole 220 of the mounting head 22 and connects the extension walls 31 and the mounting head 22 so that the second rotating member 3 can rotate on the first rotating member 2.

In this embodiment, when the multidirectional adjustment support is locked and positioned, the distance between the sleeve 12 and the convex ring portion 23 is reduced by screwing the adjustment member 4 so that the first limiting structure 1210 and the second limiting structure 231, and the first limiting structure 1210 and the third limiting structure 311 can be tightly pressed, and so that the cooperation and position limitation between the first limiting structure 1210 and both of the second limiting structure 231 and the third limiting structure 311 can be enabled. In this case, both the first rotating member 2 and the second rotating member 2 cannot rotate.

In this embodiment, when the multidirectional adjustment support is loosened and adjusted, the distance between the sleeve 12 and the convex ring portion 23 is increased by loosening the adjustment member 4 so that the cooperation and position limitation between the first limiting structure 1210 and the second limiting structure 231 and between the first limiting structure 1210 and the third limiting structure 311 can be disabled. In this case, both the first rotating member 2 and the second rotating member 3 can rotate to adjust angles.

In the embodiments of the present application, the first limiting structure 1210 is disposed on the base 1, the second limiting structure 231 is disposed on the first rotating member 2, and the third limiting structure 311 is disposed on the second rotating member 3, where the second limiting structure 231 and the first limiting structure 1210 are configured to cooperate with and limit relative positions between each other, and the third limiting structure 311 and the first limiting structure 1210 are configured to cooperate with and limit relative positions between each other, so that a single positioning structure of the base 1 can position multiple rotating members simultaneously. The structure is simple, and the positioning is convenient.

In this embodiment, the arrangement of the adjustment member connecting the base and the first rotating member can adjust the interlocking or the loosening and direction-adjustment between the first limiting structure 1210 and the second limiting structure 231 and the third limiting structure 311 so that a single adjustment operation can complete the locking and positioning or the loosening and direction-adjustment of the first rotating member 2 and the second rotating member 3. Compared with the related art in which the adjustment support can only be adjusted in one direction by loosening one structural member, the adjustment support in the embodiments of the present application is simple in structure and convenient to adjust.

In the embodiments of the present application, the opening 230 is disposed on the convex ring portion 23 on the first rotating member 2, and the third limiting structure 311 is disposed on the second rotating member 3, where the third limiting structure 311 and the first limiting structure 1210 can cooperate with and limit relative positions between each other through the opening 230, so that the first limiting structure 1210 and each of the second limiting structure 231 and the third limiting structure 311 can cooperate with and limit relative positions between each other simultaneously. Consequently, the structure is simple, and the lock is reliable.

An embodiment of the present application further includes a camera device. The camera device includes the multidirectional adjustment support of any one of the preceding embodiments and a camera apparatus mounted on the mounting base 30 of the multidirectional adjustment support. The structures and effects of the multidirectional adjustment support may refer to any one of the preceding embodiments, and details are not described herein. In the embodiments of the present application, camera angles of the camera apparatus can be easily adjusted through the multidirectional adjustment support.

In the description of the present application, the term "multiple" refers to two or more. In the description of the present application, the orientational or positional relationships indicated by terms such as "above", "below", "one side", "the other side", "one end", "the other end", "edge", "opposite", "four corners", "periphery" and "□"-shaped structure" are based on the orientational or positional relationships illustrated in the drawings. These relationships are for the mere purpose of facilitating and simplifying the description of the present application and do not indicate or imply that the structure referred to has a specific orientation and is constructed and operated in a specific orientation, and thus it is not to be construed as limiting the present application.

In the description of the present application, unless otherwise expressly specified and limited, terms such as "connected", "directly connected", "indirectly connected", "securely connected", "mounted" and "assembled" are to be construed in a broad sense, for example, as permanently connected, detachably connected, or integrated; terms such as "mounted, "connected" and "securely connected" may be directly connected, or indirectly connected via an intermediary, or interconnected between two components. Specific meanings of the preceding terms in the present application may be understood based on specific situations.

What is claimed is:

1. A multidirectional adjustment support, comprising a base, a first rotating member that is rotatably connected to the base, and a second rotating member that is rotatably connected to the first rotating member, wherein a rotation plane formed by rotation of the first rotating member intersects a rotation plane formed by rotation of the second rotating member, the base is provided with a first limiting structure, the first rotating member is provided with a second limiting structure, the first limiting structure and the second limiting structure are configured to cooperate with and limit relative positions between each other, the second rotating member is provided with a third limiting structure, and the first limiting structure and the third limiting structure are configured to cooperate with and limit relative positions between each other;

wherein the first limiting structure comprises a first limiting portion and a second limiting portion, wherein the first limiting portion and the second limiting structure are capable of cooperating with and limiting relative positions between each other, the second limiting portion and the third limiting structure are capable of cooperating with and limiting relative positions between each other, the first rotating member is provided with an opening configured for the second limiting portion or the third limiting structure to pass through.

2. The multidirectional adjustment support according to claim 1, further comprising an adjustment member connecting the base and the first rotating member, wherein the adjustment member is configured to make the base and the first rotating member to move close to each other so as to enable the first limiting structure and the second limiting structure to cooperate with and limit relative positions between each other and enable the first limiting structure and the third limiting structure to cooperate with and limit relative positions between each other, or to make the base and the first rotating member to move away from each other so as to disable the first limiting structure and the second limiting structure to cooperate with and limit relative positions between each other and disable the first limiting structure and the third limiting structure to cooperate with and limit relative positions between each other.

3. The multidirectional adjustment support according to claim 2, wherein the adjustment member is an adjustment screw, a through hole is disposed on the base, a threaded hole is disposed on the first rotating member, and the adjustment screw passes through the through hole and is connected to the threaded hole.

4. The multidirectional adjustment support according to claim 3, wherein the base comprises a support body, a bottom base disposed at one end of the support body and capable of being secured to a mounting surface, and a sleeve disposed at another end of the support body, wherein the first limiting structure is disposed at an open end of the sleeve.

5. The multidirectional adjustment support according to claim 4, wherein the first rotating member comprises a rotatable shaft, a mounting head, and a convex ring portion located between the rotatable shaft and the mounting head, the rotatable shaft extends from the open end of the sleeve into the sleeve and is rotatable in the sleeve, the convex ring portion comprises a first end surface opposite to the open end of the sleeve, and the second limiting structure is disposed on the first end surface.

6. The multidirectional adjustment support according to claim 2, wherein the base comprises a support body, a bottom base disposed at one end of the support body and capable of being secured to a mounting surface, and a sleeve disposed at another end of the support body, wherein the first limiting structure is disposed at an open end of the sleeve.

7. The multidirectional adjustment support according to claim 6, wherein the first rotating member comprises a rotatable shaft, a mounting head, and a convex ring portion located between the rotatable shaft and the mounting head, the rotatable shaft extends from the open end of the sleeve into the sleeve and is rotatable in the sleeve, the convex ring portion comprises a first end surface opposite to the open end of the sleeve, and the second limiting structure is disposed on the first end surface.

8. The multidirectional adjustment support according to claim 7, wherein the second rotating member comprises a mounting base on which an operative device is capable of being mounted, extension walls respectively extending from two sides of the mounting base toward the convex ring portion, and a pivot shaft, wherein the extension walls are configured to clamp two sides of the mounting head, the pivot shaft is connected to the mounting head and each of the extension walls, and the third limiting structure is disposed on an end surface of each of the extension walls close to the open end of the sleeve.

9. The multidirectional adjustment support according to claim 8, wherein the end surface of each of the extension walls close to the open end of the sleeve is a circular arc surface, and a central line of the circular arc surface coincides with a rotating axis of the second rotating member.

10. The multidirectional adjustment support according to claim 8, wherein the opening is provided on the convex ring portion.

11. The multidirectional adjustment support according to claim 10, wherein the first limiting structure comprises a plurality of protrusions which are disposed on an end surface of the open end of the sleeve and spaced apart in a circumferential direction of the open end of the sleeve, the second limiting structure comprises a plurality of first teeth which are arranged on the first end surface of the convex ring portion and along a circumferential direction of the convex ring portion and are capable of being engaged with one part of the plurality of protrusions, and the third limiting structure comprises a plurality of second teeth which are disposed on the end surface of each of the extension walls close to the open end of the sleeve and capable of being engaged with another part of the plurality of protrusions.

12. A camera device, comprising the multidirectional adjustment support according to claim 1, and a camera apparatus mounted on a mounting base of the multidirectional adjustment support.

13. The camera device according to claim 12, wherein the multidirectional adjustment support further comprises an adjustment member connecting the base and the first rotating member, wherein the adjustment member is configured to make the base and the first rotating member to move close to each other so as to enable the first limiting structure and the second limiting structure to cooperate with and limit relative positions between each other and enable the first limiting structure and the third limiting structure to cooperate with and limit relative positions between each other, or to make the base and the first rotating member to move away from each other so as to disable the first limiting structure and the second limiting structure to cooperate with and limit relative positions between each other and disable the first limiting structure and the third limiting structure to cooperate with and limit relative positions between each other.

14. The camera device according to claim 13, wherein the adjustment member is an adjustment screw, a through hole is disposed on the base, a threaded hole is disposed on the first rotating member, and the adjustment screw passes through the through hole and is connected to the threaded hole.

15. The camera device according to claim 13, wherein the base comprises a support body, a bottom base disposed at one end of the support body and capable of being secured to a mounting surface, and a sleeve disposed at another end of the support body, wherein the first limiting structure is disposed at an open end of the sleeve.

16. The camera device according to claim 15, wherein the first rotating member comprises a rotatable shaft, a mounting head, and a convex ring portion located between the rotatable shaft and the mounting head, the rotatable shaft extends from the open end of the sleeve into the sleeve and is rotatable in the sleeve, the convex ring portion comprises a first end surface opposite to the open end of the sleeve, and the second limiting structure is disposed on the first end surface.

17. The camera device according to claim 16, wherein the second rotating member comprises the mounting base, extension walls respectively extending from two sides of the mounting base toward the convex ring portion, and a pivot shaft, wherein the extension walls are configured to clamp two sides of the mounting head, the pivot shaft is connected to the mounting head and each of the extension walls, and the third limiting structure is disposed on an end surface of each of the extension walls close to the open end of the sleeve.

18. The camera device according to claim 17, wherein the end surface of each of the extension walls close to the open end of the sleeve is a circular arc surface, and a central line of the circular arc surface coincides with a rotating axis of the second rotating member.

19. The camera device according to claim 17, wherein the first limiting structure comprises a first limiting portion and a second limiting portion, wherein the first limiting portion and the second limiting structure are capable of cooperating with and limiting relative positions between each other, the second limiting portion and the third limiting structure are capable of cooperating with and limiting relative positions between each other, and the convex ring portion is provided with an opening configured for the second limiting portion or the third limiting structure to pass through.

20. The camera device according to claim 19, wherein the first limiting structure comprises a plurality of protrusions which are disposed on an end surface of the open end of the sleeve and spaced apart in a circumferential direction of the open end of the sleeve, the second limiting structure comprises a plurality of first teeth which are arranged on the first end surface of the convex ring portion and along a circumferential direction of the convex ring portion and are capable of being engaged with one part of the plurality of protrusions, and the third limiting structure comprises a plurality of second teeth which are disposed on the end surface of each of the extension walls close to the open end of the sleeve and capable of being engaged with another part of the plurality of protrusions.

* * * * *